United States Patent
Hupp et al.

(10) Patent No.: US 7,505,424 B1
(45) Date of Patent: Mar. 17, 2009

(54) VOICE CONFERENCE APPARATUS, VOICE CONFERENCE SYSTEM AND METHOD FOR REALIZING A VOICE CONFERENCE

(75) Inventors: Jurgen Hupp, Nuremberg (DE); Martin Tittel, Forchheim (DE); Xuelei Hu, Erlangen (DE); Roland Strum, Nuremberg (DE); Thomas Kauppert, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 185 days.

(21) Appl. No.: 11/702,778

(22) Filed: Feb. 5, 2007

Related U.S. Application Data

(63) Continuation of application No. PCT/EP2005/008469, filed on Aug. 4, 2005.

(30) Foreign Application Priority Data

Aug. 4, 2004  (DE) .................. 10 2004 037 856

(51) Int. Cl.
   *H04L 12/16* (2006.01)
(52) U.S. Cl. .................. 370/260; 370/261; 370/270; 379/205.01
(58) Field of Classification Search .............. 370/260, 370/261, 270; 379/205.01
See application file for complete search history.

(56) References Cited

U.S. PATENT DOCUMENTS

| | | | |
|---|---|---|---|
| 3,210,476 A | 10/1965 | Shaer | |
| 4,416,007 A * | 11/1983 | Huizinga et al. | 370/267 |
| 4,809,262 A | 2/1989 | Klose | |
| 5,493,568 A * | 2/1996 | Sampat et al. | 370/261 |
| 5,524,110 A * | 6/1996 | Danneels et al. | 709/204 |
| 5,559,876 A | 9/1996 | Alperovich | |
| 5,913,062 A | 6/1999 | Vrvilo | |
| 6,327,567 B1 * | 12/2001 | Willehadson et al. | 704/270 |
| 6,329,908 B1 | 12/2001 | Frecska | |
| 7,430,288 B2 * | 9/2008 | Yoshida | 379/158 |
| 2004/0218553 A1 | 11/2004 | Friedrich | |

FOREIGN PATENT DOCUMENTS

| | | |
|---|---|---|
| DE | 35 15 646 C1 | 8/1986 |
| DE | 37 06 128 C1 | 8/1988 |
| DE | 101 13 088 A1 | 9/2002 |
| DE | 102 38 286 A1 | 3/2004 |
| DE | 20 2004 012219 U1 | 12/2004 |
| EP | 0 677 962 A1 | 10/1995 |
| EP | 0 936 795 A2 | 8/1999 |
| EP | 0 954 156 A2 | 11/1999 |
| WO | WO 92/19 062 A1 | 10/1992 |
| WO | WO 99/27 701 A1 | 4/1999 |
| WO | WO 01/08 394 A1 | 2/2001 |

* cited by examiner

*Primary Examiner*—Patricia Nguyen
(74) *Attorney, Agent, or Firm*—Michael A. Glenn; Glenn Patent Group

(57) ABSTRACT

A voice conference apparatus consists of at least one base conference block having three or more signal ports, each including an input for a digitalized voice signal and an output for a digitalized voice signal, wherein a base conference block is configured such that, at a signal port, optionally a terminal or another base conference block may be coupled up using a coupler for the realization of a voice conference apparatus extended with respect to the number of participants or in terms of space, and wherein a base conference block is configured to enable a voice conference among the terminals or base conference blocks coupled thereto, and a remote coupler configured to couple a base conference block with at least one other spatially remote base conference block in order to enable a spatially extended voice conference. A voice conference system may be composed of at least two spatially separate voice conference apparatuses and is structured in a decentralized and modular way and is flexibly extensible.

29 Claims, 5 Drawing Sheets

VOICE CONFERENCE APPARATUS, VOICE CONFERENCE SYSTEM AND METHOD FOR REALIZING A VOICE CONFERENCE

CROSS-REFERENCE TO RELATED APPLICATION

This application is a continuation of copending International Application No. PCT/EP2005/008469, filed on Aug. 4, 2005, which designated the United States and was not published in English.

BACKGROUND OF THE INVENTION

1. Field of the Invention

The present invention refers generally to a voice conference apparatus and a method for realizing a voice conference, and especially to a distributed digital wireless voice conference system.

2. Description of the Related Art

Radio-based voice conference systems are utilized wherever it is not possible to communicate directly within a group of people due to a large distance, too high a noise level or other reasons. Several people are to be able to speak to one another via wireless-connected hearing and/or speaking sets, with everyone being able to hear all other participants at any time. I.e., there is a duplex voice link to every participant.

Thus, in a modern voice conference system a voice link that is quasi free from delay and full-duplex-capable amongst a large number of talk-listen units is to be established. Here it is important for economical reasons to keep the installation expenditure as low as possible. Furthermore, it is very important that the system is structured modularly and is flexible to be extended to a system of quasi any size. Apart from that, it must be possible that resources already present can be used further. On the customer side, this particularly refers to cabling as well as terminals already present. On the producer side, circuit concepts already present are to be used further. The circuit technology used is to be easy to realize at low cost. Nowadays, excellent voice quality is also expected of a modern voice conference system. Specifically, interference signals coupled into the transmission link and into a conference node must be very low. Finally, it is necessary in wireless systems to utilize the radio resources available as effectively as possible. The sum of these requirements calls for the refinement of the as yet existing concepts for voice conference systems.

According to the prior art, voice conference systems with base stations coupled in an analog manner or wireless DECT private branch exchanges are typically used today. In conference systems with base stations coupled in an analog manner the mobile units connected to a base station conference with one another. Several base stations are coupled in an analog manner. The circuit required here for the forming of a conference includes analog circuit technology which with high expenditure is to prevent the coupling in of interferences into the analog signals used. This requires complex filters and is not feasible in an ideal manner. With a greater number of participants the interference noises would add up until the system became impracticable. Therefore, conference systems with base stations coupled in an analog manner do not meet the high demands placed on modern voice conference systems.

The installation expenditure is very high due to the necessary use of well-screened cables. Even with a low number of participants, the voice quality is not satisfactory, and interference effects may easily be coupled in. Also, flexible extension to a large number of participants is difficult due to the problems of the interference effects. Finally, today the use of analog circuit technology involves considerably higher cost compared to the use of digital circuits.

Apart from the conference systems with base stations coupled in an analog manner described above, wireless DECT private branch exchanges with digital voice transmission are customary today. Here the conference connection is made in a central unit. This also involves several disadvantages. Particularly the use of a central unit able to maintain a large number of radio links simultaneously is very costly. A modular extension of the system is very difficult to achieve. In addition, the use of a central unit involves spatial limitation of the conference system. Finally, the internal structure of a central unit differs greatly from that of a base station of a normal, i.e. not conference-capable, cordless telephone system. This leads to high costs.

The realization of a conference connection within a central unit is conventionally effected by the use of a signal processor adapted to perform the calculations required for the realization of a voice conference block. An example of such a signal processor is the SC14428 type by National Semiconductor. For further details regarding the capabilities of the signal processor, please refer to the accompanying documentation.

SUMMARY OF THE INVENTION

Starting from this prior art, it is the object of the present invention to provide a modular digital voice conference apparatus, a voice conference system as well as a method for the operation thereof.

In accordance with a first aspect, the present invention provides a voice conference apparatus having at least one base conference block having three or more signal ports, each including an input for a digitalized voice signal and an output for a digitalized voice signal, wherein a base conference block is formed such that, at a signal port, optionally a terminal or another base conference block may be coupled using coupling means for realizing a voice conference apparatus extended with respect to the number of participants or in terms of space, and wherein a base conference block is formed to enable a voice conference among the terminals or base conference blocks coupled thereto; and remote coupling means formed to couple a base conference block with at least one other spatially remote base conference block in order to enable a spatially extended voice conference, wherein the remote coupling means is further formed for a transmission of synchronization information in order to synchronize transmitting cycles of mobile units in contact with various voice conference apparatuses.

In accordance with a second aspect, the present invention provides a voice conference system having at least two spatially separate base conference blocks having three or more signal ports, each including an input for a digitalized voice signal and an output for a digitalized voice signal, wherein a base conference block is formed such that, at a signal port, optionally a terminal or another base conference block may be coupled using coupling means for the realization of a voice conference apparatus extended with respect to the number of participants or in terms of space; and remote coupling means via which the base conference blocks are coupled to one another, wherein remote coupling means is further formed for a transmission of synchronization information in order to synchronize transmitting cycles of mobile units in contact with various base conference blocks.

In accordance with a third aspect, the present invention provides a method for operating a distributed voice conference system with two base conference blocks (20, 22) coupled to each other via a signal port each according to one of claims 13 to 28, including reading the digitalized voice signals from the inputs of the two or more signal ports of a first base conference block that are coupled to the terminals; reading the digitalized voice signals from the inputs of the two or more signal ports of a second base conference block that are coupled to the terminals; calculating a first sum value from the read digitalized voice signals of the first base conference block; calculating a second sum value from the read digitalized voice signals of the second base conference block; outputting the first sum value at the output of the signal port of the first base conference block, which is coupled to a signal port of the second base conference block; outputting the second sum value at the output of the signal port of the second base conference block, which is coupled to a signal port of the first base conference block; reading the second sum value from the input of the signal port of the first base conference block, which is coupled to a signal port of the second base conference block; reading the first sum value from the input of the signal port of the second base conference block, which is coupled to a signal port of the first base conference block; calculating output values at the outputs of the signal ports of the first base conference block connected to a terminal by the summation of the values read from the inputs of the respective other signal ports of the first base conference block including the second sum value transmitted from the second base conference block; calculating output values at the outputs of the signal ports of the second base conference block connected to a terminal by the summation of the values read from the inputs of the respective other signal ports of the second base conference block including the first sum value transmitted from the first base conference block; and outputting the output values at the outputs of the signal ports of the two base conference blocks, which are coupled to terminals.

The present invention provides a voice conference system with at least one base conference block comprising three or more signal ports, each including an input for a digitalized voice signal and an output for a digitalized voice signal, a base conference block being adapted such that optionally a terminal or another base conference block for the realization of a voice conference apparatus extended with regard to the number of participants or with regard to space may be coupled to a signal port with the help of coupling means, and a base conference block being adapted to facilitate a voice conference amongst the terminals or base conference blocks coupled to the same and remote coupling means adapted to couple a base conference block with at least one other spatially remote base conference block so as to enable a spatially extended voice conference.

Apart from that, the present invention provides a voice conference system as well as a method for operating a voice conference system.

The present invention is based on the finding that with a fully digital realization of voice signal processing and transmission, high voice quality can be guaranteed, interferences can be effectively suppressed, and system costs can be reduced by the use of digital circuit technology. Moreover, the present invention is based on the finding that by the use of base conference blocks which are flexibly connectable a modular, quasi arbitrarily extensible voice conference system can be constructed with little expenditure. A decentralized formation of subconferences, which is enabled by the fact that spatially separate base conference blocks can be coupled to one another, renders a costly central unit unnecessary.

Individual nodes of the conference system now differ only in terms of software, however not in terms of hardware.

The transmission of the digital voice signals between several base conference blocks enabled by the use of remote coupling means permits a spatially extended voice conference with high voice quality, a single base conference block calculating a local subconference, which leads to a distribution of the calculation expenditure involved and reduces the amount of data to be transmitted compared to conventional centralized conference systems.

Thus, the present voice conference system differs from the systems according to the prior art specifically in that voice transmission and voice processing are effected completely digitally without requiring a central station defined by special features in terms of hardware. On the contrary, the bulk of the signal processing is effected in a decentralized manner. Such a voice conference apparatus and/or such a voice conference system involves a number of advantages. Specifically, voice quality is high due to digital processing and transmission, and the susceptibility to interferences is low. The distributed realization reduces hardware expenditure and installation costs as the cabling is simplified considerably compared to conventional systems. Modularity ensures flexible extension. A node used in such a distributed voice conference system differs, apart from remote coupling means enabling the spatial extension, only little in hardware from that used in a normal telephone system so that hardware already present may continue to be used with only few modifications. It is possible to assemble a voice conference system from a plurality of spatially distributed units that are substantially identical in hardware.

In one embodiment of the present voice conference apparatus a base conference block is adapted such that to each output of a signal port a digitally formed sum signal of the input signals of the respective other signal ports is present in digital form. This is advantageous in that the digital processing enables very simple summation. Moreover, signal reflection, i.e. outputting the voice signal read from the input of a signal port to the output of the same signal port, can be inhibited. Finally, such a configuration of the base conference block enables an arbitrary extension of the system, it only being necessary to transmit digital signals on all links.

In another preferred embodiment one or more terminals are coupled to a base conference block via a wireless connection, which is enabled by a suitable configuration of the remote coupling means. The wireless connection to one or more terminals can be specifically effected according to the DECT standard or a standard based on the same. The wireless connection is advantageous in that the conference participants can move freely around the room. Here the transmission of the voice signals according to a digital standard enables high voice quality with good suppression of interferences and good utilization of the frequency resources available. The conversion of the audio signals into digital signals and vice versa is performed directly in the terminal. Moreover, if the wireless connection is made according to the DECT standard or a standard based on the same, standard terminals and base stations that already exist and ones which are available at low prices can be used.

In another embodiment a talk-listen unit is coupled to a base conference block via means for the conversion of analog signals into digital signals and means for the conversion of digital signals into analog signals. This enables the operation of a talk-listen unit positioned at the same location as the base conference block. Thus, an additional stationary user may be integrated into the voice conference at little expenditure.

In another embodiment, one or more base conference blocks are coupled to a first base conference block via a wireless connection. This is advantageous in that the voice conference apparatus may be extended without any installation expenditure. Such a solution is further advantageous in that the frequency resources available can be utilized effectively. The only prerequisite is that the transmitting power of the mobile units must be high enough to reach the nearest base conference block while the possibly more remote base conference blocks communicate with one another via a radio link with greater transmitting power.

In another preferred embodiment one or more further base conference blocks are coupled to a first base conference block via a wire bus. Here, too, it is the object of the remote coupling means to enable and manage the connection. Particularly advantageously, the wire bus is configured for transmitting several voice channels in time-division multiplex. Such an arrangement is advantageous in that a voice conference apparatus may be extended in any desired manner in terms of space without occupying frequency resources in the process. By means of a wire bus almost any distance may be bridged. Specifically, the transition to wide-area telephone networks is possible. The transmission of several voice channels in time-division multiplex on one bus is advantageous in that a plurality of connections may be established at low installation expenditure. The use of the bus principle in cabling here eliminates the restraint of having to determine as early as at the installation of the system which of the communication nodes is to take on which function. Rather, each connected device is equal with regard to the installation, and not until the operation of the system is it decided which function in the data transmission is to be fulfilled by the respective device. The use of a time-division-multiplex method reduces the hardware expenditure compared to frequency-division-multiplex methods, which require extensive modulation and frequency conversion. Furthermore, a time-division-multiplex method with fixedly defined time slots for each transmission channel is thoroughly real time capable, which is not guaranteed for other network systems using, for example, collision detection.

In another preferred embodiment a base conference block is realized by a processor in connection with suitable resident software. Here, the processor can be used further for providing a user interface, for encoding data, or for realizing a transmission protocol. Such an arrangement is advantageous in that an existing processor may be used for the realization of the voice conference. Accordingly, no additional hardware to that already present is required for the realization of the voice conference. In addition, the realization of a base conference block by means of a processor is advantageous compared to a hard-wired solution in that changes in the functionality may be achieved solely by changing the software. This reduces development costs and permits a very universal and flexible system that can be re-configured even during runtime.

In another preferred embodiment a base conference block with a predetermined number of signal ports is formed in that several sub-conference blocks, each of which comprising less than the predetermined number of signal ports, are coupled to one another. This concept is advantageous in that a base conference block can be assembled modularly from several sub-conference blocks of the same kind. Accordingly, it suffices to provide several small conference blocks. This results in the standardization of the required hardware and/or software, which involves a substantial reduction in costs. Furthermore, this concept is the basis for distributed system realizations.

A voice conference system includes at least two base conference blocks as described above as well as a means via which the base conference blocks are coupled to one another. In one preferred embodiment of a voice conference system at least two of the base conference blocks are separated in terms of space. This makes the realization of a distributed voice conference system possible.

In one embodiment at least two of the base conference blocks are coupled via a wireless connection. This in turn enables flexible extension of the voice conference system without any installation expenditure.

In another embodiment at least two of the base conference blocks are coupled by means of a wire bus. Particularly advantageously, the wire bus is configured for transmitting several voice channels in time-division multiplex. The advantages of such an embodiment have already been explained in detail above.

In another embodiment the voice conference system comprises at least two terminals, a duplex voice link being present among all existing terminals. This is advantageous in that all the individuals taking part in the voice conference are able to listen and talk simultaneously. Thereby the voice conference system imitates the presence of all participating individuals in a common place in a good way.

In another embodiment of a voice conference system, one or more of the base conference blocks are part of a DECT base station. Furthermore, one or more of the terminals may be DECT mobile stations. Such an embodiment is advantageous in that a voice conference system may be integrated into an existing DECT system without any great expenditure. This guarantees compatibility particularly with existing terminals. It also ensures a digital wireless transmission of the voice signal with little interference. Furthermore, on the producer side the expenditure for the development of the hardware for the telephone conference system is low, as existing components can be used further with only minor alterations to be made.

In another preferred embodiment the DECT base stations and the DECT mobile stations are identical in terms of hardware. This is advantageous in that the number of hardware variations within the system is reduced, which decreases manufacturing costs and enables flexible re-configuration of the system at any time. The system characteristics are defined solely by software, which may be easily replaced.

The present invention further provides two methods for operating a voice conference apparatus or a voice conference system. The methods are effectuated particularly in the operation of a base conference block, wherein the realization may be effected both in hardware and by a microprocessor in connection with a suitable program. The present methods are advantageous in that the processing of digitalized voice signals required for the realization of a voice conference may be performed in a very simple and universal manner. Two methods may be used, wherein the first method according to claim 17 is of advantage if only one local voice conference is to be realized or if the demands placed on the time coordination of the voice signals are low. In a second method according to claim 18, the processing of the data supplied by local terminals and the processing of the sum signals supplied by other base conference blocks is effected in separate steps. Such a method is of advantage if the demands placed on the time coordination of the voice signals in a voice conference system that is distributed widely in terms of space are very high. With such a method, in particular delays occurring on the transmission path may be offset virtually completely, so that all participants can be heard simultaneously, independent of their current location and of their distance to one another.

BRIEF DESCRIPTION OF THE DRAWINGS

These and other objects and features of the present invention will become clear from the following description taken in conjunction with the accompanying drawing, in which.

DESCRIPTION OF THE PREFERRED EMBODIMENTS

Figure 1:
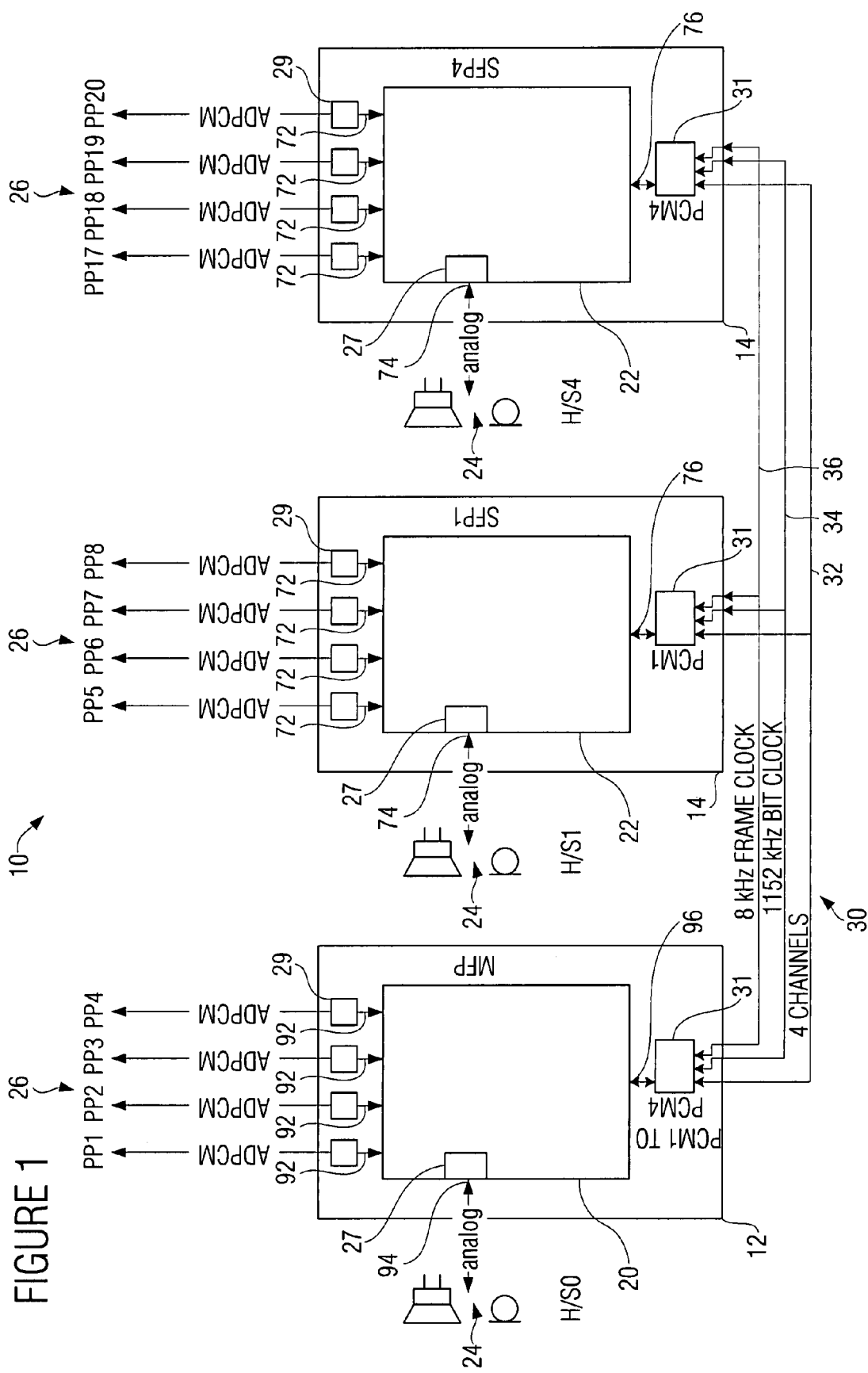
FIG. 1 shows a system diagram of an embodiment of a voice conference system.

FIG. 1 shows a system diagram of an embodiment of a voice conference system that in its entirety is designated by 10. The voice conference system includes a master base station 12 as well as four similar slave base stations 14, two of which are shown here representatively. The core of the master basis station 12 is a conference block 20 with nine inputs. The core of a slave base station is a conference block 22 with six inputs. One talk-listen unit 24 as well as four mobile units 26 capable of transmitting digital audio signals via a bi-directional radio link are coupled to master base station 12 as well as each of slave base stations 14. Here, talk-listen units 24 are connected in an analog manner to the respective conference blocks, while the digitalized voice signals are exchanged in an ADPCM-encoded manner with DECT mobile units 26. ADPCM stands for adaptive differential pulse code modulation. The coupling of the talk-listen units 24 is accomplished via means 27 for the conversion of analog signals into digital signals and vice versa, the coupling of DECT mobile units 26 is accomplished via radio coupling means 29. Slave base stations 14 are connected to master base station 12 via serial bus 30. Here, the provision and processing of the bus signals is taken over by one remote coupling means 31 in each of base stations 12, 14. Serial bus 30 substantially includes three lines, a data line 32, on which the data of four voice channels are transmitted in time-division multiplex, a line 34 for the bit clock, and a line 36 for the frame clock.

The core of master base station 12 is a conference block with nine participants 20, and the core of a slave base station 14 is a conference block 22 with six participants. The structure and mode of operation of the conference blocks with nine participants and six participants 20, 22 will be explained in the following with regard to FIGS. 2 to 4 before the mode of operation of the entire voice conference system 10 will finally be explained with regard to FIG. 1.

Figure 2:
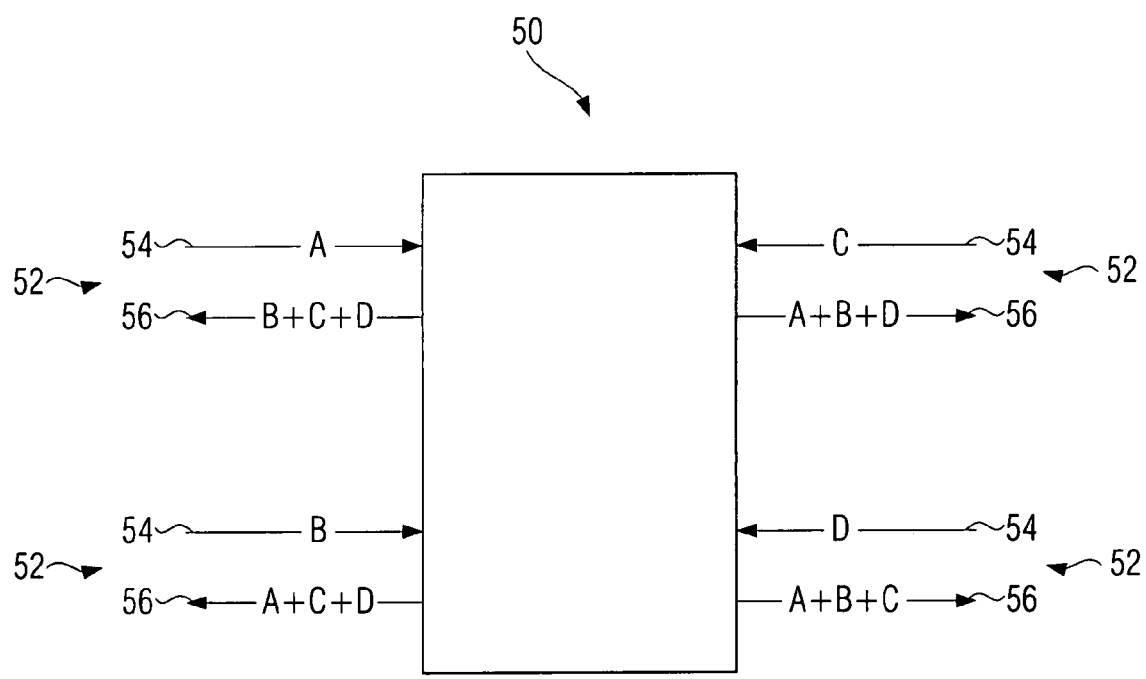
FIG. 2 shows a block diagram of an embodiment of a base conference block with a maximum of four participants.

FIG. 2 shows a block diagram of an embodiment of a base conference block with a maximum of four participants, which in its entirety is designated by 50. Base conference block 50 for a maximum of four participants comprises four signal ports 52, each comprising one input 54 for a digitalized voice signal and one output 56 for a digitalized voice signal. Here, the digital input signals at the four signal ports 52 are designated by A, B, C and D. Circuitry in the interior of base conference block 50 is configured such that it reads input signals 54 from the four signal ports 52 and at each of the four outputs 56 outputs the sum of input signals 54 at the other signal ports 52. Here, signal processing within a base conference block is effected in a fully digital manner. Thus, the base conference block realizes the core characteristics of a conference circuit. The input signal from input 54 of a signal port 52 is transmitted to the outputs 56 of the respective other signal ports 52 but not to the output 56 of the dedicated signal port 52.

Figure 3:
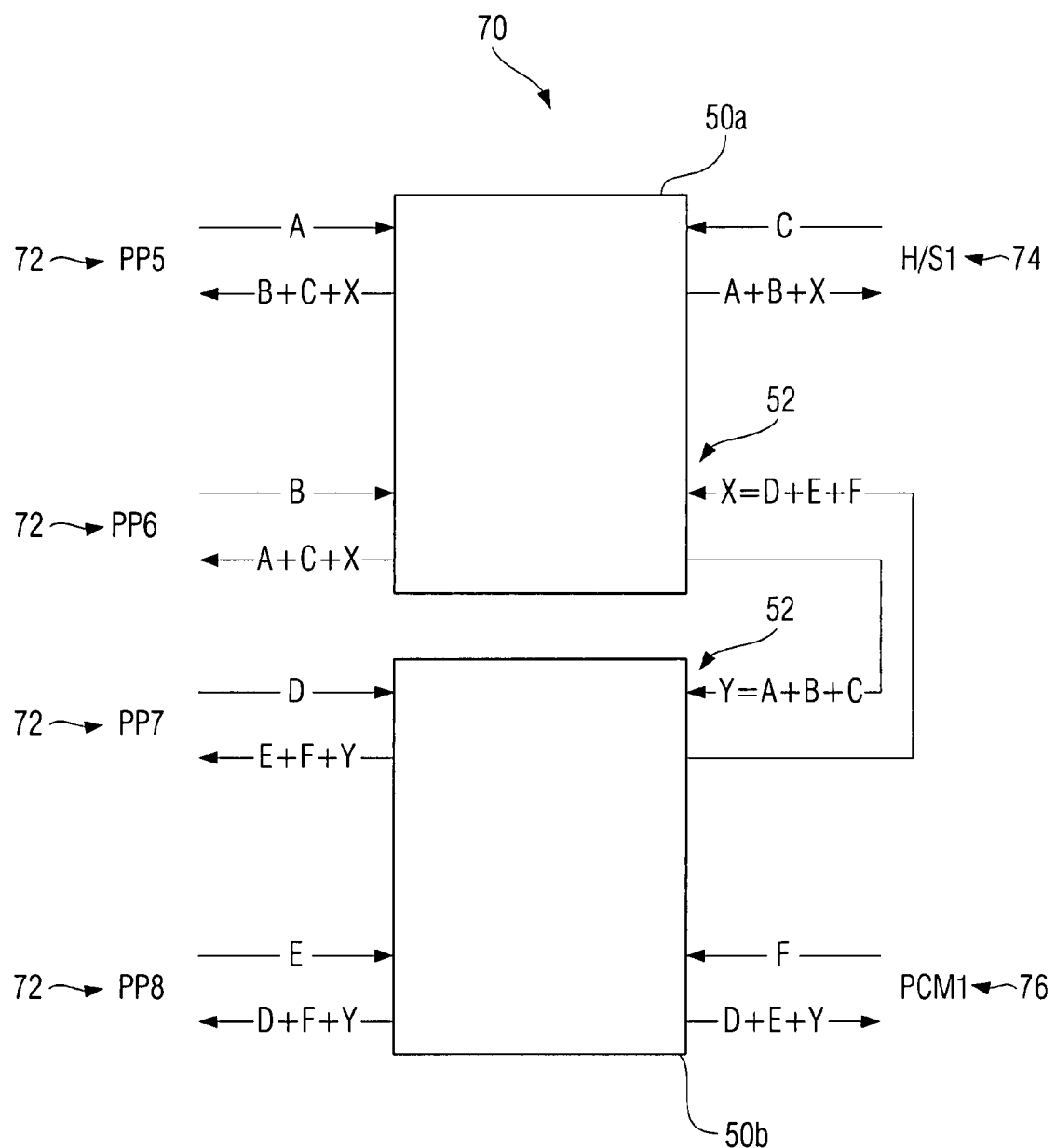
FIG. 3 shows a block diagram of an embodiment of a conference block with six participants.

FIG. 3 shows a block diagram of an embodiment of a conference block with six participants, which in its entirety is designated by 70. The same is established by interconnecting two base conference blocks 50a, 50b with four inputs each. Therefore, a total of six signal ports 72 are available. Here, each base conference block 50a, 50b provides three external signal ports 72, 74, 76. Via one signal port 52 of each of the two base conference blocks 50a, 50b a connection is made between these two. Here, too, the circuit and the inner structure of the base conference blocks ensure that to the output of each of the external signal ports 72, 74, 76 the digitally formed sum of the input signals of the other signal ports 72, 74, 76, respectively, is applied.

Figure 4:
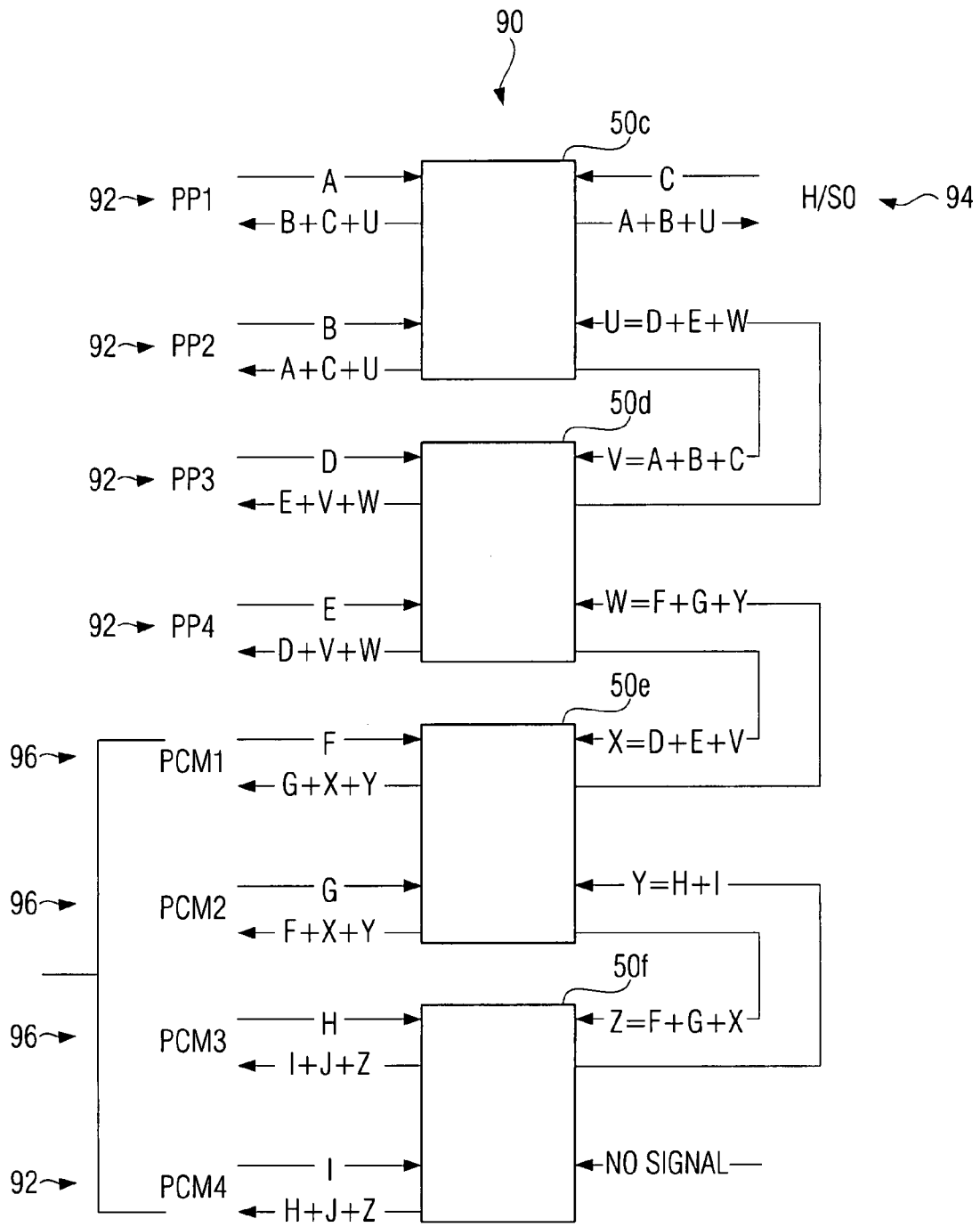
FIG. 4 shows a block diagram of an embodiment of a conference block with nine participants.

FIG. 4 shows a block diagram of an embodiment of a conference block with nine participants, which in its entirety is designated by 90. The same includes four base conference blocks 50c, 50d, 50e, 50f with four signal ports each and comprises nine external signal ports 92, 94, 96. A first base conference block 50c provides three external signal ports 92, 94 and at one signal port is connected with another second base conference block 50d. the second base conference block 50d provides two external signal ports 92 and at one signal port each is connected to the first base conference block 50c and a third base conference block 50e. The latter again provides two external signal ports 96 and at its fourth signal port is connected to a fourth base conference block 50f. The fourth base conference block 50f again provides two external signal ports 92. One signal port of the fourth base conference block 50f is not wired up. Thus, a total of nine external signal ports 92, 94, 96 are provided. To each output of an external signal port the sum of all inputs with the exception of the dedicated signal port is applied.

The description of the base conference block 50 as well as the extended conference blocks with six participants 70 and/or nine participants 90 shows that based on a small base conference block with a given number of signal ports larger conference blocks with more signal ports can be assembled by means of suitable circuitry. The essential characteristics of the signal blocks, in particular the fact that an input signal is transmitted to the outputs of all other signal ports but not to the output of its own signal port, are maintained.

Based on the understanding of base conference blocks 50 and extended base conference blocks 70, 90 with six participants or nine participants respectively, now the mode of operation of voice conference system 10 according to FIG. 1 will be discussed. In the present embodiment, both master base station 12 and slave base stations 14 are similarly structured DECT base stations. In the present embodiment, mobile units 26 are DECT mobile stations. The base stations may also be operated in a mobile manner. In the present embodiment the base stations and mobile stations have identical structures in terms of hardware, and are configured as radio modules. The difference consists solely in the loaded software (firmware). Both for base stations and for mobile stations, each DECT derivative may be used in different frequency bands DECT in the 2.4 GHz band with a frequency-jump method. The audio signals are transmitted via air between base stations 12, 14 and mobile units 26 in an ADPCM-encoded manner, according to the DECT standard.

Respective conversion into PCM-encoded signals is feasible, and is effected within the mobile units and within the base station.

As a whole, transmission across the air link is effected largely transparently so that it can be assumed that the voice signal received by the respective mobile units 26 is present in digitalized form at the inputs of signal ports 92, 72 and that the digitalized voice signal present at the outputs of signal ports 92, 72 is outputted via the loudspeakers of the associated mobile units 26. A bi-directional analog/digital converter circuit connected between the talk-listen unit 24 and conference blocks 20, 22 ensures that the microphone signal of a respective local talk unit is present in digital form at the DECT base station at the input of the associated signal port 94, 74 and that the digital voice signal is outputted at the output of signal port 94, 74 at the local loudspeaker.

A difference is made here between a local conference, which only includes the mobile units 26 connected to the respective base station as well as local talk-listen unit 24, and a global conference, wherein the local conferences of the respective base stations 12, 14 are combined to form an overall conference. Per base station, several mobile stations may be operated in a local conference connection. Therefore, in a local conference, all participants connected directly to a base station are able to speak to one another. Here, the connection between the base stations is at first not taken into account. The local conference is achieved by adding the PCM-encoded voice signals from the mobile units 26 and the local talk-listen unit 24 in a conference block 20, 22 such that at the output of a signal port 92, 94, 72, 74, the sum of the input signals of all other signal ports 92, 94, 72, 74 of a conference block is present. The practical implementation of this calculation rule is comparably easy to achieve by digitally adding the voice signals present in PCM-encoded form in the DECT processor of base station 12, 14. The formation of a local conference therefore does not result in any additional circuit complexity. Here, the maximum number of mobile units 26 per base station 12, 14 is determined by the system properties of base station 12, 14, for example by the maximum number of simultaneous radio connections and the maximum number of voice channels that may be used simultaneously.

Starting from the procedure for the formation of a local conference just described, a global conference where participants at all terminals 24, 26 connected to all base stations 12, 14 can speak to one another simultaneously, can be established. Here, the local conferences are advantageously combined to form larger distributed conferences. The subconference signals are exchanged among the base stations in digital form (PCM-encoded). In order to achieve this, base stations 12, 14 are connected via a wire serial bus 30, on which several logical channels are transmitted in time-division multiplex. One of the base stations, that have identical structures in terms of hardware, assumes the role of a master (master base station 12) by appropriate configuration. The master is responsible for combining the subconferences of the other base stations (slave base stations 14). Furthermore, master base station 12 performs the synchronization of serial bus 30. A logical bi-directional connection between master base station 12 and each of slave base stations 14 is established via wire serial bus 30. The transmission in both directions and between master 12 and the respective slave base station 14 is effected by means of logical channels in time-division multiplex. The digitalized voice signals are transmitted PCM-encoded via this link. Thus, the bus connection between master base station 12 and slave base stations 14 is also transparent, i.e. equal to a direct bi-directional point-to-point connection between master base station 12 and each of slave base stations 14. All tasks of bus management are fulfilled by remote coupling means 31.

Thus, the master base station essentially corresponds to a conference block 20 with nine participants which is connected to four mobile talk-listen units 26, a local talk-listen unit 24 as well as four other conference blocks 22. A slave base station essentially corresponds to a conference block 22 with six participants which is connected to four mobile talk-listen units 26, one local talk-listen unit 24 and base conference block 20.

Thus, the operation of the overall voice conference system is to be understood in detail as follows: In each mobile unit 26 a wirelessly received input signal is outputted in an analog manner at the loudspeaker of the respective talk-listen unit. The microphone signal of the talk-listen unit of each mobile unit 26 is digitally transmitted to respective base station 12,14. In the slave base stations, an input signal received by a local mobile unit 26 via air is outputted in an analog manner to the local talk-listen unit 24 as well as digitally passed on to the other local mobile units 26 and to master base station 12. The microphone signal at the local talk-listen unit 24 of a slave base station 14 is transmitted digitally to master base station 12 and to local mobile units 26. Furthermore, in slave base station 14 the signal coming from master base station 12 is outputted in an analog manner at talk-listen unit 24 as well as digitally transmitted to local mobile units 26.

In master base station 12, an input signal received by a local mobile unit 26 via air is outputted in an analog manner to local talk-listen unit 24 as well as digitally passed on to the other local mobile units 26 and to all slave base stations 14. The microphone signal at the local talk-listen unit 24 of the master base station is digitally transmitted to all slave base stations 14 and to the local mobile units 26. Furthermore, in master base station 12, the signal coming from a slave base station 14 is outputted in an analog manner at talk-listen unit 24 as well as digitally transmitted to the other slave base stations 14 and local mobile units 26.

Thus, in master base station 12, the local conference of the master base station is combined with the local conferences of slave base stations 14. Therefore a considerable part of the calculation expenditure involved is transferred to slave base stations 14, in each of which a local subconference is already calculated. In particular, not all terminals 24, 26 must have a (direct or logical) connection to a central base station. The transmission of appropriate sum signals, as described above, is sufficient. This significantly reduces the requirements for the connection between the terminals and the central station.

It is obvious that the shown embodiment is not the only realization of the present invention. On the contrary, the voice conference system described herein can be altered in a wide range. By way of example, the number of mobile units and local talk-listen units may be altered. In the embodiment described one master base station and four slave base stations are used. Each of the base stations is connected to and synchronized with four mobile units via a radio link. Therefore the mobile stations can establish or disconnect a radio link with audio signal transmission to the associated base station. Furthermore, the base station comprises a local talk-listen unit. Therefore the voice conference system described above is suitable for the establishment of a voice conference, of up to 25 participants.

Depending on the requirements and technical possibilities, the number of mobile stations per base station may be varied. Furthermore, the local talk unit at the base station may be omitted or more than one local talk unit may be used. The number of slave base stations may be increased if, at the same time, the number of logical channels on the serial bus connecting the slave base stations to the master base station is increased. It may readily be seen that the scalability on a local and global level is a great advantage of the inventive voice conference system.

In another embodiment of the present invention, the connection between the master base station and the slave base stations can be realized in a different manner. The wire serial bus may be replaced by any other connection as long as a voice transmission with sufficient quality and little temporal delay is guaranteed. In particular, any high-speed bus system may be used. Furthermore, it is conceivable to connect several base stations via a (preferably digital) public telephone network. Such a solution is advantageous in that the voice conference system may be extended greatly in terms of space. Furthermore, the connection between the master base station and the slave base stations may also be effected in a wireless manner. This is advantageous in that installation expenditure is significantly reduced. Basically it is also conceivable to implement a voice conference system according to the present invention as an ad hoc system. I.e., the configuration of the system and particularly the configuration of a wireless device as terminal, as master base station, or as slave base station is effected automatically. This is possible as there is no difference in hardware between terminal, master base station, and slave base station. Accordingly, the hardware is very universally applicable and any configuration of the voice conference system can be achieved easily.

In another embodiment, the DECT base stations and DECT mobile stations may be replaced by base stations and mobile stations conforming to another standard. In the signal transmission to the mobile units as well, the ADPCM coding may be replaced by any signal coding. Therefore the voice conference system according to the present invention is not bound to any particular communication standard.

Furthermore, the link between several base stations may be used not only for the transmission of digitalized voice signals, but also for the transmission of synchronization information. Especially the transmitting frequencies and transmitting cycles of the mobile units in contact with the various base stations may be synchronized. This allows a more efficient utilization of the frequency resources.

For example, a first time-division multiplex transmission between a first base conference block and the mobile units in contact with the first base conference block and a second time-division multiplex transmission between a second base conference block and the mobile units in contact with the second base conference block may be coordinated in terms of time and/or frequency. This allows to accomplish that, in the first time-division multiplex transmission, only time slots are used that are not used in the second time-division multiplex transmission, and vice versa. For this purpose, information on a frame structure of the time-division multiplex transmission between the base stations and the mobile units may be transmitted among the base stations over the link between the base stations so that, for example, the base stations involved can use the same frame structure for the communication with the mobile units. Thus, transmitting cycles of the base stations and/or of the mobile units in contact with various base stations may be coordinated.

Here, the frame structure of the time-division multiplex transmission specifies, for example, time slots allocated to the individual base stations and/or mobile units, or details of the association of time slots with base stations and/or mobile units. By way of example, the frame structure may provide that, with a total of N mobile units, the $n^{th}$ ($1<=n<=N$) time slot of a frame is allocated to the communication between the $n^{th}$ mobile unit and the associated base station (wherein in turn a first part of the $n^{th}$ time slot may be allocated to a transmission from the base station to the mobile unit, and a second part of the $n^{th}$ time slot may be allocated to a transmission from the mobile unit to the associated base station). A frame may, moreover, include further synchronization information.

Thus, the frame structure may be made known to all participants (base stations and preferably mobile stations as well) by the connection between the base stations. Apart from that, the frame structure of the time-division multiplex transmission may also be adapted dynamically to the number of mobile stations present. A (data) transmission rate required by the individual mobile stations can also be taken into consideration when determining the frame structure.

The described coordination of the frame structure facilitates, for example, the management in the case of movement of a specific mobile station. If the specific mobile station moves from the coverage area of a first base station into a coverage area of a second base station, it is possible, using the inventive base stations with a remote coupling means for the transmission of synchronization information, to transmit a time slot of the time-division-multiplex frame structure, in which the first base station has communicated with the specific mobile station, to the second base station for a communication with the specific mobile station. The transmission of the respective synchronization information may be effected via the remote coupling means. This enables "roaming", i.e. the transfer of a mobile unit from one base station to another base station without exchanging synchronization information with the mobile unit. Synchronization is instead performed among the base stations using the remote coupling means.

It is, however, also possible to use a fixed frame structure, which is distributed from a central base station to all other base stations via the remote coupling means and is also transmitted to the mobile units, if necessary.

Apart from that, it is to be noted that via the remote coupling means not there may not only be exchanged information on the frame structure among the base stations, but there may also be performed a time synchronization of the base stations, so that all base stations simultaneously recognize a beginning of a frame.

The implementation of a base conference block may also be altered greatly. The realization is possible both by a processor in connection with a suitable program and in hardware, for example in the form of a programmable logic unit or an application specific integrated circuit. Furthermore, the base conference block may be realized either as a whole or, as shown, be divided into sub-blocks. The form to be preferred basically depends on the realization form present and on the number of signal ports required.

In another embodiment, the hierarchical structure, where a difference is made between the master base station and the slave base station, can be eliminated. For the operability of a voice conference system according to the present invention, the fact that a digitalized voice signal can be transmitted from any conference block to any other conference block is sufficient. If the latencies in the transmission are low, then the number of interposed conference blocks will be of no importance. Specifically it is sufficient that there is a point-to-point connection between every two adjacent conference blocks. Such a system configuration corresponds to the one shown in FIG. 4, while the base conference blocks may also be separated in terms of space.

In another embodiment, several local subconferences may be formed as well. The calculation may be performed both decentralized and in a master base station. In particular, it is possible to determine which station is to act as the master base station during runtime of the system.

Figure 5:
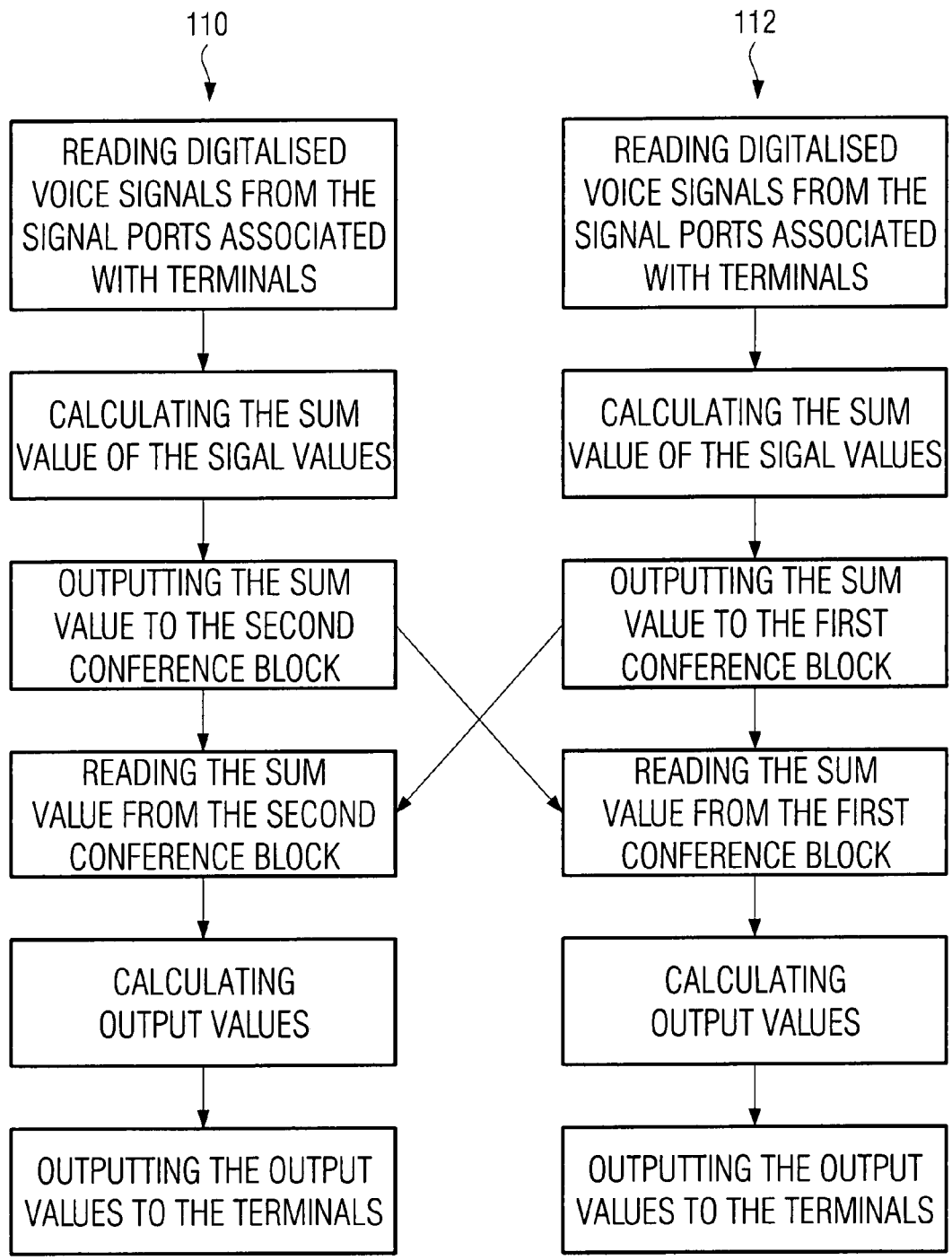
FIG. 5 shows a flow diagram of an embodiment of a method according to the invention for operating a voice conference system.

FIG. 5 shows a flow diagram of an embodiment of a method according to the invention for operating a voice conference system with two base conference blocks. The method is performed in parallel in two base conference blocks, wherein the method steps in the first conference block are designated by 110 and the method steps in the second conference block are designated by 112. In a first step, in both base conference blocks, digitalized voice signals are read from the inputs of two or more signal ports coupled to terminals. In a second step, the signal values read from the terminals are added in both conference blocks. The sum value is then outputted at a signal port connected to the respective other conference block. Accordingly, the sum value outputted by the respective other conference block is then read. Finally, output values for the signal ports connected to the terminals are created in each conference block by summation of the signal values read from the respective other signal ports connected to terminals and the sum values transmitted by the other base conference block. In a last step, they are outputted to the terminals.

The inventive method thus generates a clear temporal sequence in the summation and in the exchange of sum values among several conference blocks. The locally created sum values must first be exchanged among the base conference blocks involved, before the final output value for the terminals can be calculated. Such a method is necessary particularly when the transmission time between individual conference blocks is long due to a large run time on the transmission link. The aforementioned method thus makes it possible that the signals of all participants are outputted simultaneously at a terminal, irrespective of whether they are connected to the same conference block as the terminal or to a spatially remote conference block.

The present invention thus provides a voice conference system enabling a voice conference with very high voice quality. The audio signals are converted directly at the microphones into digital signals which are significantly more resistant to interference coupling than analog signals. The decentralized formation of subconferences renders a complex central unit superfluous. The base stations and the mobile units may be identical in terms of structure and differ only in the respective operational software. In particular, a voice conference system using the base conference blocks according to the invention may be very flexibly configured and adapted to a large number of digital communication standards.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A voice conference apparatus comprising:
at least one base conference block comprising three or more signal ports, each including an input for a digitalized voice signal and an output for a digitalized voice signal,
wherein a base conference block is formed such that, at a signal port, optionally a terminal or another base conference block may be coupled using a coupler for realizing a voice conference apparatus extended with respect to the number of participants or in terms of space, and
wherein a base conference block is formed to enable a voice conference among the terminals or base conference blocks coupled thereto; and
a remote coupler formed to couple a base conference block with at least one other spatially remote base conference block in order to enable a spatially extended voice conference,
wherein the remote coupler is further formed for a transmission of synchronization information in order to synchronize transmitting cycles of mobile units in contact with various voice conference apparatuses.

2. The voice conference apparatus according to claim 1, wherein the remote coupler is formed to couple a base conference block with at least two other spatially remote base conference blocks to which terminals are coupled in order to enable a voice conference among the terminals coupled to a total of at least three spatially distributed base conference blocks.

3. The voice conference apparatus according to claim 1, wherein a base conference block is formed such that, at each output of a signal port, a digitally created sum signal of the input signals at the inputs of the respective other signal ports is present in digital form.

4. The voice conference apparatus according to claim 1, wherein one of the couplers includes a radio coupler formed such that a terminal can be coupled to a base conference block via a wireless connection.

5. The voice conference apparatus according to claim 4, wherein the radio coupler is formed such that it enables a wireless connection between the voice conference apparatus and a terminal according to the DECT standard or a standard based thereon.

6. The voice conference apparatus according to claim 1, wherein a talk-listen unit is coupled to the base conference block via a converter of analog signals to digital signals and a converter of digital signals to analog signals.

7. The voice conference apparatus according to claim 1, wherein the remote coupler is formed such that at least one other base conference block may be coupled to a first base conference block via a wireless connection.

8. The voice conference apparatus according to claim 1, wherein the remote coupler is formed such that at least one other base conference block may be coupled to a first base conference block via a wire bus.

9. The voice conference apparatus according to claim 8, wherein the wire bus is formed for a transmission of several voice channels in time-division multiplex.

10. The voice conference apparatus according to claim 1, wherein the base conference block is realized by a processor in connection with suitable operational software.

11. The voice conference apparatus according to claim 10, wherein the processor is simultaneously used for at least one of the following tasks:
provision of a user interface,
coding of data,
realization of a transmission protocol.

12. The voice conference apparatus according to claim 1, wherein a base conference block with a predetermined number of signal ports is formed by coupling several sub-conference blocks, each comprising less than the predetermined number of signal ports, wherein a sub-conference block is formed such that, at a signal port, optionally a terminal, another sub-conference block, or a base conference block may be coupled using a coupler.

13. A voice conference system comprising:
at least two spatially separate base conference blocks comprising three or more signal ports, each including an input for a digitalized voice signal and an output for a digitalized voice signal,
wherein a base conference block is formed such that, at a signal port, optionally a terminal or another base conference block may be coupled using a coupler for the realization of a voice conference apparatus extended with respect to the number of participants or in terms of space; and
a remote coupler via which the base conference blocks are coupled to one another,
wherein the remote coupler is further formed for a transmission of synchronization information in order to synchronize transmitting cycles of mobile units in contact with various base conference blocks.

14. The voice conference system according to claim 13, including at least three base conference blocks that are separated in terms of space.

15. The voice conference system according to claim 13, wherein at least two of the base conference blocks are coupled via a wireless connection.

16. The voice conference system according to claim 13, wherein at least two of the base conference blocks are coupled via a wire bus.

17. The voice conference system according to claim 16, wherein the wire bus is formed for the transmission of several voice channels in time-division multiplex.

18. The voice conference system according to claim 13, wherein the voice conference system has at least two terminals, wherein a duplex voice link exists among all terminals.

19. The voice conference system according to claim 13, wherein one or more of the terminals are coupled to a base conference block via a wireless connection.

20. The voice conference system according to claim 19, wherein the wireless connection to one or more terminals is effected according to the DECT standard or a standard based thereon.

21. The voice conference system according to claim 13, wherein one or more of the base conference blocks are part of a DECT base station.

22. The voice conference system according to claim 13, wherein one or more of the terminals are DECT mobile units.

23. The voice conference system according to claim 21, wherein the DECT base stations and the DECT mobile units match in hardware.

24. The voice conference system according to claim 13, wherein a talk-listen unit is coupled to a base conference block via a converter of analog signals to digital signals and a converter of digital signals to analog signals.

25. The voice conference system according to claim 13, wherein a base conference block is formed such that, at each output of a signal port, a digitally created sum signal of the input signals of the respective other signal ports is present in digital form.

26. The voice conference system according to claim 13, wherein a base conference block is realized by a processor in connection with suitable operational software.

27. The voice conference system according to claim 26, wherein the processor is used simultaneously for at least one of the following tasks:
provision of a user interface,
coding of data,
realization of a transmission protocol.

28. The voice conference system according to claim 13, wherein a base conference block with a predetermined number of signal ports is formed by coupling several subconference blocks, each comprising less than the predetermined number of signal ports;
wherein a subconference block is formed such that, at each signal port, optionally a terminal, another subconference block or a base conference block may be coupled using a coupler.

29. A method for operating a distributed voice conference system with two base conference blocks coupled to each other via a signal port each according to claim 13, comprising:
reading the digitalized voice signals from the inputs of the two or more signal ports of a first base conference block which are coupled to the terminals;
reading the digitalized voice signals from the inputs of the two or more signal ports of a second base conference block which are coupled to the terminals;
calculating a first sum value from the read digitalized voice signals of the first base conference block;
calculating a second sum value from the read digitalized voice signals of the second base conference block;
outputting the first sum value at the output of the signal port of the first base conference block, which is coupled to a signal port of the second base conference block;
outputting the second sum value at the output of the signal port of the second base conference block, which is coupled to a signal port of the first base conference block;
reading the second sum value from the input of the signal port of the first base conference block, which is coupled to a signal port of the second base conference block;
reading the first sum value from the input of the signal port of the second base conference block, which is coupled to a signal port of the first base conference block;
calculating output values at the outputs of the signal ports of the first base conference block connected to a terminal by the summation of the values read from the inputs of the respective other signal ports of the first base conference block including the second sum value transmitted from the second base conference block;
calculating output values at the outputs of the signal ports of the second base conference block connected to a terminal by the summation of the values read from the inputs of the respective other signal ports of the second base conference block including the first sum value transmitted from the first base conference block; and
outputting the output values at the outputs of the signal ports of the two base conference blocks, which are coupled to terminals.

* * * * *

UNITED STATES PATENT AND TRADEMARK OFFICE
CERTIFICATE OF CORRECTION

| | | |
|---|---|---|
| PATENT NO. | : 7,505,424 B1 | Page 1 of 1 |
| APPLICATION NO. | : 11/702778 | |
| DATED | : March 17, 2009 | |
| INVENTOR(S) | : Hupp et al. | |

It is certified that error appears in the above-identified patent and that said Letters Patent is hereby corrected as shown below:

On the Title Page, item (75), Inventors: Jurgen Hupp, "Nuremberg" (DE); Martin Tittel, Forchheim (DE); Xuelei Hu, Erlangen (DE); Roland "Strum", "Nuremberg" (DE); Thomas Kauppert, "Nuremberg" (DE) should be changed to Inventors: Jurgen Hupp, --Nuernberg-- (DE); Martin Tittel, Forccheim (DE); Xuelei Hu, Erlanged (DE); Roland --Sturm--, --Nuernberg-- (DE); Thomas Kauppert, --Nuernberg-- (DE)

Signed and Sealed this
Nineteenth Day of February, 2013

Teresa Stanek Rea
*Acting Director of the United States Patent and Trademark Office*